SYSTEM FOR REGULATION OF THREE-PHASE MACHINES

Filed Aug. 31, 1967 5 Sheets-Sheet 1

SYSTEM FOR REGULATION OF THREE-PHASE MACHINES

Filed Aug. 31, 1967 5 Sheets-Sheet 2

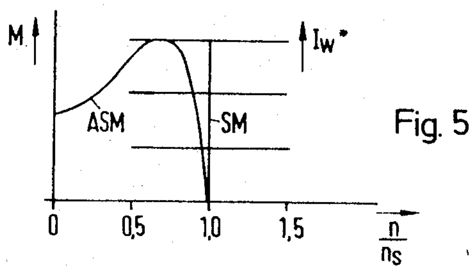
Fig. 5
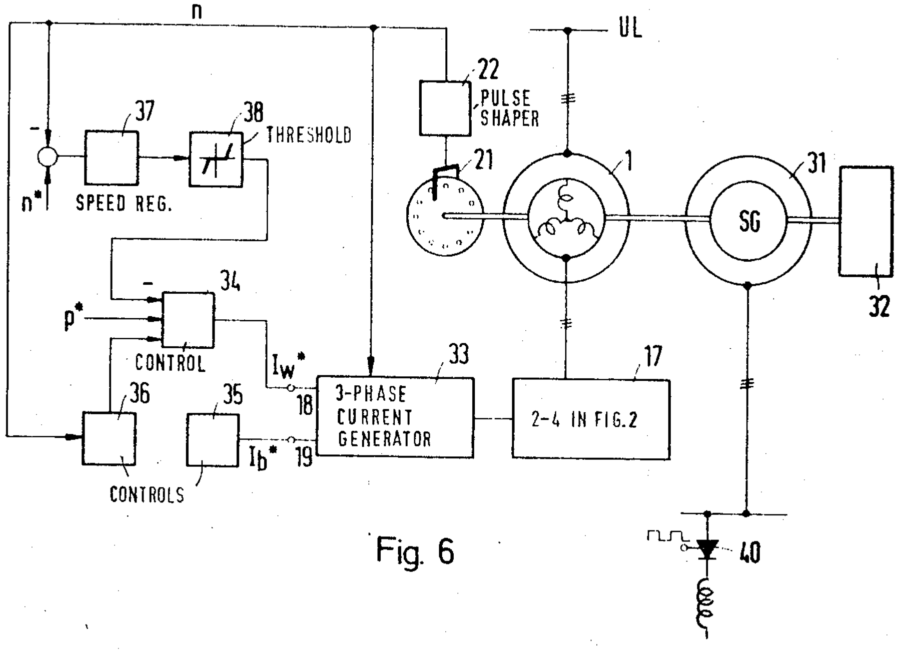
Fig. 6
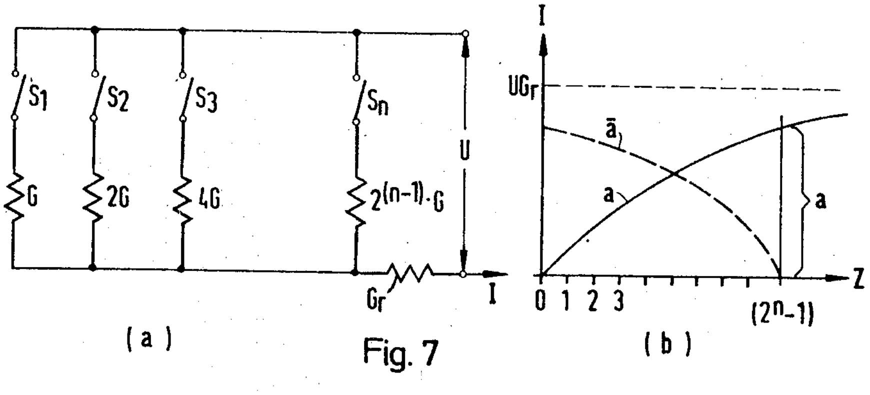
(a) Fig. 7 (b)

SYSTEM FOR REGULATION OF THREE-PHASE MACHINES

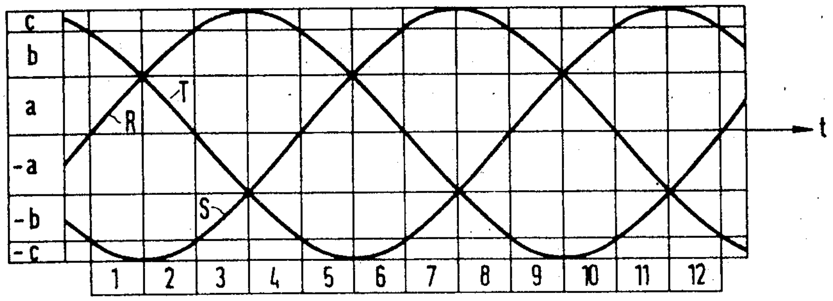

Fig. 8

| | | 1 | 2 | 3 | 4 | 5 | 6 | 7 | 8 | 9 | 10 | 11 | 12 |
|---|---|---|---|---|---|---|---|---|---|---|---|---|---|
| $R_a$ | + | a | b | c | $\bar{c}$ | $\bar{b}$ | $\bar{a}$ | | | | | | |
| | − | | | | | | | a | b | c | $\bar{c}$ | $\bar{b}$ | $\bar{a}$ |
| $S_a$ | + | | | | | a | b | c | $\bar{c}$ | $\bar{b}$ | $\bar{a}$ | | |
| | − | c | $\bar{c}$ | $\bar{b}$ | $\bar{a}$ | | | | | | | a | b |
| $T_a$ | + | $\bar{b}$ | $\bar{a}$ | | | | | | | a | b | c | $\bar{c}$ |
| | − | | | a | b | c | $\bar{c}$ | $\bar{b}$ | $\bar{a}$ | | | | |
| $R_b$ | + | $\bar{c}$ | $\bar{b}$ | $\bar{a}$ | | | | | | | a | b | c |
| | − | | | | a | b | c | $\bar{c}$ | $\bar{b}$ | $\bar{a}$ | | | |
| $S_b$ | + | | a | b | c | $\bar{c}$ | $\bar{b}$ | $\bar{a}$ | | | | | |
| | − | $\bar{a}$ | | | | | | | a | b | c | $\bar{c}$ | $\bar{b}$ |
| $T_b$ | + | | | | | | a | b | c | $\bar{c}$ | $\bar{b}$ | $\bar{a}$ | |
| | − | b | c | $\bar{c}$ | $\bar{b}$ | $\bar{a}$ | | | | | | | a |

Fig. 9

United States Patent Office 3,506,900
Patented Apr. 14, 1970

3,506,900

SYSTEM FOR REGULATION OF THREE-PHASE MACHINES

Ingemar Neuffer, Eugen Buder, Rudolf Dirr, and Hermann Waldmann, Erlangen, Germany, assignors to Siemens Aktiengesellschaft, Berlin, Germany, a corporation of Germany Filed Aug. 31, 1967, Ser. No. 664,670
Claims priority, application Germany, Sept. 3, 1966, S 105,679
Int. Cl. H02p 7/62
U.S. Cl. 318—237 8 Claims

ABSTRACT OF THE DISCLOSURE

A system for regulating a dynamoelectric three-phase machine is designed for controlling the speed of the rotor to maintain it in synchronism with the rotating field of the stator independently of changes in speed. This is done by connecting to the slip rings of the rotor and hence to its three-phase windings an external excitation circuit which contains respective thyristors in each of its three phases. The thyristors are controlled by solid-state regulating equipment which receives an input magnitude proportional to the slip angle of the machine and correspondingly fires the thyristors to supply the rotor windings with a three-pulse excitation current varying with the amount of slip. This regulating equipment comprises a digital three-phase current generator constituted by a network of solid-state logic components which furnish a three-phase datum-reference current proportional to the slip. The datum reference is compared with a pilot quantity proportional to the actual amount of current supplied to the rotor windings, the regulation being in accordance with the difference between the slip-responsive reference magnitude and the pilot magnitude.

Our invention relates to a system for regulating the operation of dynamoelectric AC motors or generators.

A characteristic operational feature of conventional synchronous machines is a rigid relation of the rotor speed to the rotating speed of the stator field produced by the line frequency. The torque produced or taken up by the machine is dependent upon the angle between the excitation-field axis of the pole wheel and the stator rotating field, this angle being supposed to remain within 90° for reasons of operational stability. The rigid frequency relation of the rotor angle to the mechanical torque, on the one hand, and to the active and reactive power of the machine, on the other hand, involve not only the known stability problems but have also the disadvantage that the electrical active power and the reactive power cannot be adjusted independently of each other and that mechanical power can be supplied or taken off only at synchronous speed of rotation.

It is known for coupling transformers between three-phase distribution networks of respectively different frequencies to energize the rotor of a three-phase machine in such a manner that the rotating field produced by the rotor is not rigidly tied to the stator-field position but is rotated relative to the rotor in opposition to, and by the same amount as, the slip occurring between the rotor and the stator rotating field. This has the consequence that, irrespective of the rotor speed, the rotating fields produced by the stator and the rotor respectively will maintain a given mutual position determined by the independently presettable reactive and active components of the three-phase machine. The known distribution-line coupling of this type requires using a large and expensive machine cascade for generating the slip frequency to be fed into the rotor of the coupling. Such a machine cascade comprises two controlling synchronous machines followed by a frequency converter in the form of a commutator machine and a Scherbius machine for amplifying the output voltage of the commutator machine. The complicated rotating machinery requiring a considerable amount of maintenance, especially due to the commutator machine, poses additional problems which, aside from commutation difficulties, are also due to the occurrence of a change in phase position as a result of slip-frequency changes, thus calling for additional compensating expedients.

It is an object of our invention to minimize or virtually eliminate the above-mentioned disadvantages of the known synchronous-machine regulating systems.

Another object of the invention is to provide a synchronous-machine regulating system that secures a synchronous rotation of the rotor field independently of the rotor speed and with the aid of solid-state circuitry virtually free of maintenance requirements.

Further objects as well as various other advantages of our invention will become apparent from the description presented in the following.

In accordance with the invention, we provide for regulation of three-phase dynamoelectric machines so as to secure a rotor-field speed in synchronism with the stator field independently of changes in rotor speed, and to this end provide the three-phase rotor winding, connected to the slip rings of the rotor, with an external excitation circuit that comprises controlled rectifiers in connection with the respective slip rings; and we control the firing or gate circuits of these rectifier means, such as thyristors, by a regulator network in response to the slip conditions of the machine so as to effect a rectifier control which provides the rotor windings with a three-phase current that varies in dependence upon the slip and is adjustable as to its phase position.

According to another feature of our invention, the datum values for thus operating the current-controlling regulator are furnished with the aid of a three-phase current generator composed of solid-state components or modules, this generator being under control by a slip-responsive input voltage or current. Such three-phase generators may be substantially composed of three sine-function generators of a type known and available in the analog computer art, the three sine-function generators being operated in a time sequence of 120° electrical phase displacement.

To meet particularly exacting requirements as to accuracy and reproducibility, and according to another feature of our invention, we provide a three-phase current generator of the digital type for the just-mentioned purpose of issuing the slip-responsive dataum value for the control of the rectifiers in the external rotor circuit. Such a digital generator preferably comprises a repetitively operating digital counter as well as a stepping switch actuated to progress stepwise in the end positions of the counter and acting upon a distribution gate. Further provided in such a digital generator are non-linear hyperbolic digital-analog converters for forming the sine function within an angular range of 60°, these converters being connected to complementary outputs of the counter and also acted upon by the distribution gate to extend the sine function over the entire cycle range. With such an organization, the frequency, amplitude and phase-position data of the required three-phase current system can be adjusted without delay and independently of each other, and the electrical control quantities being employed can be processed on a low power level.

According to a further feature of the invention, the system of three-phase currents required for controlling the current supplied to the rotor windings is obtained by adding the output signals of two digital-analog converters 90° time-displaced from each other. The two converters receive as operating voltage two constant adjustable voltages proportional to the desired active or reactive power. The counter common to the two digital-analog converters is acted upon by the outut pulses of a difference gate which receives one input as a line-frequency proportional pulse sequence and the other input as a slip-proportional pulse sequence. In this manner and without further computation there is afforded a direct presetting of the active and reactive power data of interest for the operation of the dynamoelectric machine.

Securing a definite phase position of the rotor rotational field in synchronism with the rotating field of the stator requires ascertaining the instantaneous rotor position relative to the rotating vector of the stator field. This vector can be sensed by conventional instruments for measuring the pole-wheel angle. In accordance with a further feature of the invention, however, such relatively complicated instrumentalities may be dispensed with, by adjusting the phase position of the rotor field vector, and hence the load angle, with the aid of additional correction pulses which are supplied to the difference gate through a voltage-frequency converter. The additional correction pulses are derived from the difference between the respective departures between the adjusted or datum values and the actual or pilot values of active power and reactive power.

A dynamoelectric machine regulated in a system according to the invention is capable of furnishing a constant torque within a relatively large range of speeds while permitting an an adjustment of the reactive power independently of that torque. This makes the system also suitable for buffering of active power and/or reactive power. For this purpose the adjusted or datum value for determining the active power may be guided or modified by an active-current regulator within a given speed range independently of the speed. In this speed range an active- and reactive-power buffering can take place independently of the speed, whereas the active-power regulation is substituted by speed regulation when the critical speeds are attained. Thus applied, a regulating system according to the invention is particularly advantageous for machines which drive generators for feeding intermittently excited proton accelerators. This is because the system permits the occurring considerable shocks of active current to be kept away from the feeding power line. Similar shock-load conditions occur with drives for rolling mills, so that the invention is also advantageously applicable for such and similar load conditions.

The invention will be further described with reference to the accompanying drawings, illustrating by way of example a number of different embodiments.

FIGS. 4 and 5 are explanatory diagrams relating to operations occurring in systems according to the invention.

FIG. 6 is the circuit diagram of still another embodiment of the invention.

FIG. 7*a* is a simplified schematic circuit diagram of a digital-analog converter applicable as a three-phase sine wave generator in systems according to the invention, and FIG. 7*b* is a coordinate diagram explanatory of the operation of such a sine wave generator.

FIG. 8 is an explanatory graph and FIG. 9 a table of phase-related polarities concerning the three-phase sine waves generated by a device as shown in FIG. 7*a*.

Figure 3:
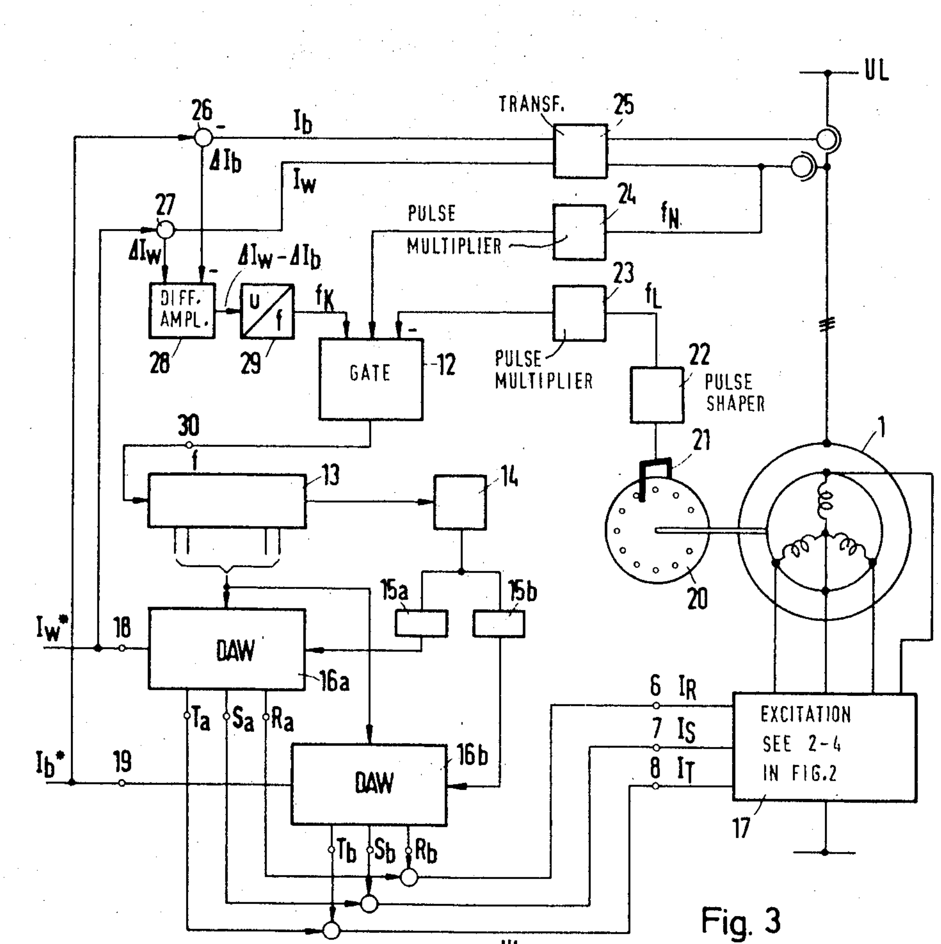
FIG. 3 is the circuit diagram of another embodiment of such a system.
Figure 10:
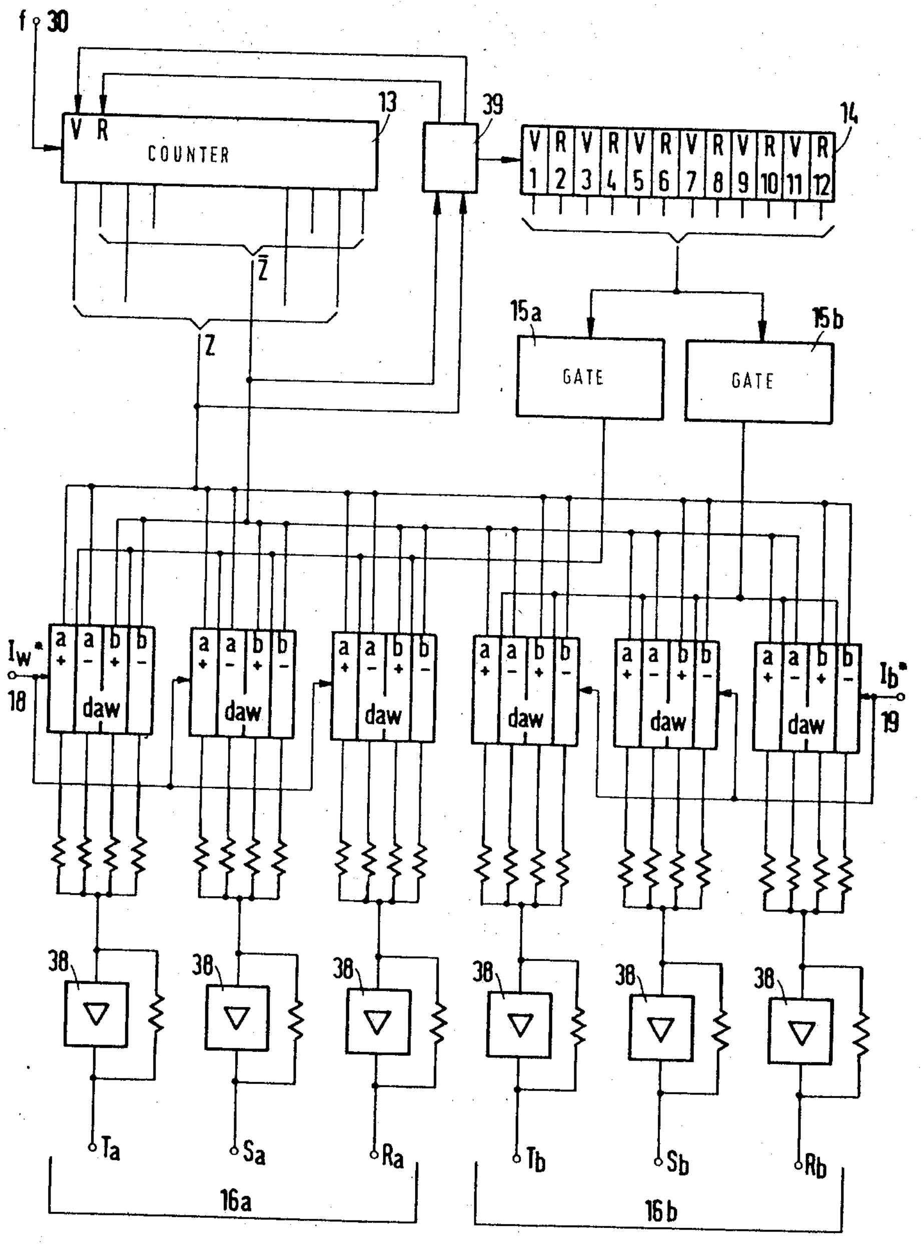

FIG. 10 is the circuit diagram of a digital three-phase sine current generator involving the principles of FIGS. 7 to 9 and applicable in the system shown in FIG. 3 or FIG. 6.

Seen from the energizing line, a three-phase machine in a system according to the invention behaves like a conventional synchronous machine. For that reason, it will be helpful toward understanding the invention, to first refer to the current-vector diagram of the synchronous machine shown in FIG. 1, the ohmic resistance of the stator winding being neglected and an operation of the machine as a motor being assumed.

Figure 1:
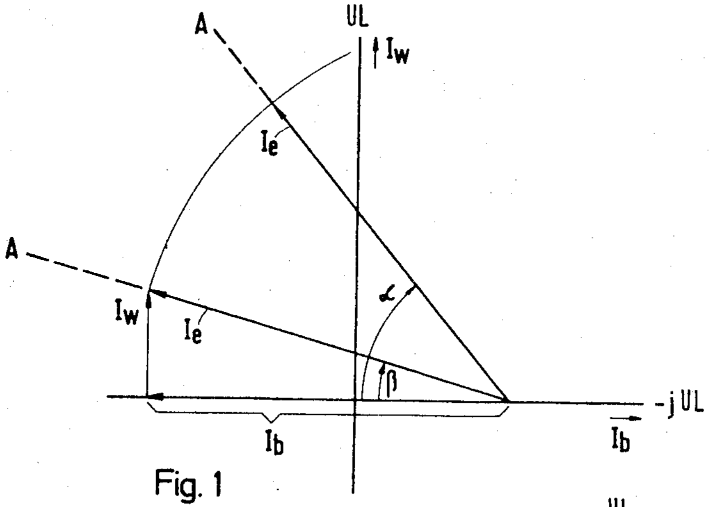
FIG. 1 is an explanatory current-vector diagram relating to a synchronous dynamoelectric machine.

In the diagram of FIG. 1, the vertical reference axis denotes active current from the feeder line UL, and the horizontal reference axis denotes the reactive current $-j$UL. In a conventionally operating synchronous machine the rotating magnetomotive force or ampere turns of the excitation $I_e$ is always dependent upon the instantaneous position of the rotor axis, two such positions being indicated at A. Hence the position A also determines the load angle $\beta$ between the rotating excitation field of the rotor and the rotating field of the stator. As the mechanical load increases, the load angle also increases, for example to the value $\alpha$ so that, on the one hand, the active and reactive power conditions change and, on the other hand, there occurs the danger of exceeding the critical load angle of 90° which may cause falling out of step and slipping uncontrollably. As mentioned, it is one of the objects of our invention to eliminate the rigid tie between the rotating field of the stator and the position of the stator and to rather guide the rotor field and consequently the vector $I_e$ of the corresponding magnetomotive force independently of the instantaneous rotor position, thus maintaining a constant phase position to the vector of the line voltage and securing synchronism with the stator field independently of speed fluctuations.

For this purpose, a three-phase stator winding is impressed by currents in such a manner as to produce therein a rotating magnetomotive force vector $I_e$ which according to FIG. 1 will always lag behind the rotor position A by the angle $\alpha-\beta$. Once the vector $I_e$ is fixed in its phase position ($\beta$), it will retain this position irrespective of whether and to what extent the slip angle ($\alpha$) will vary. Consequently, the currents thus passed through the three phases of the rotor winding are in accordance with the following equations:

$$
\begin{aligned}
I_R &= I_e \cos(\alpha-\beta) \\
I_S &= I_e \cos(\alpha-\beta+120^\circ) \qquad (1) \\
I_T &= I_e \cos(\alpha-\beta+240^\circ)
\end{aligned}
$$

The current system according to the Equations (1) enforces a sinusoidal field distribution along the rotor periphery which, with a constant amplitude $I_e$ and phase $\beta$, maintains a constant position relative to the stator rotating field independently of the slip angle $\alpha$.

Figure 2:
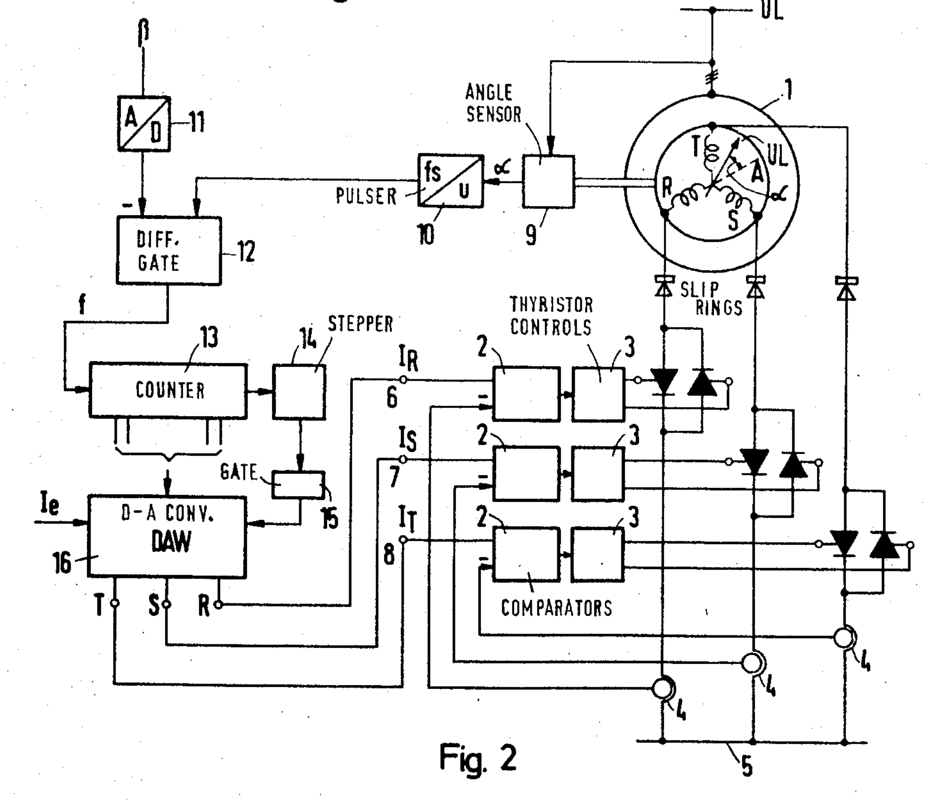
FIG. 2 is a schematic circuit diagram of a regulating system according to the invention.

Referring now to FIG. 2 there is shown a three-phase machine at 1 whose stator winding is connected to a three-phase power line UL. The rotor winding has its three phases R, S, T connected through slip rings to a three-phase external circuit with three rectifying devices constituted by thyristors. In the illustrated example, each phase of the rotor external circuit is provided with two antiparallel connected thyristors so that direct currents of alternating magnitude can be impressed upon the stator in both directions of current flow. The control of these currents is effected by means of control units 3 acting upon the respective firing or gate electrodes of the thyristors and being in turn controlled by respective phase current regulators (comparators) 2. The control and regulator units 3, 2 are not further shown or described in detail because they may consist of conventional circuits or modules obtainable from various manufacturers such as Siemens A.G., Munich, or directly through Siemens America Inc., Empire State Building, New York City. This also applies to various other units or modules shown in this and other illustrations, although an example of a detailed circuit diagram for some of them will be described in a later place with reference to FIG. 10.

Three current transformers 4 supply pilot currents proportional to the actual current intensity of the phase currents flowing through the rotor windings. The regulators 2, constituting each a differential comparator, are provided with two inputs of which one receives the corresponding pilot current from the appertaining current transformer 4. The comparator 2 compares the pilot value with the intended datum value $I_R$, $I_S$ or $I_T$ supplied to the second input. The thyristor control units 3 are thus actuated in response to the resulting difference or error voltage or current. By selecting a sufficiently high amplifying gain in the current regulating circuits of the comparators 2, as well as by applying a sufficiently high feed voltage at 5, it can be ascertained that the phase currents supplied to the stator windings always correspond to the datum values applied to the terminals 6, 7 and 8.

For directly determining the instantaneous angle $\alpha$ between the rotor field vector A and the rotating vector UL of the line voltage, there is provided an angle measuring sensor instrument 9 whose output furnishes a direct voltage proportional to the angle $\alpha$. This direct voltage is supplied to a voltage-to-frequency converter 10 to be converted to a pulse sequence whose frequency is proportional to the angle $\alpha$. The angle-responsive pulse sequence is supplied to one of the two inputs of a difference gate 12. The other input of gate 12 is connected to an analog-digital converter 11 whose input is furnished as a constant direct voltage proportional to the desired load angle $\beta$. The difference gate 12 subtracts from the angle-responsive pulse sequence a number of pulses corresponding to the load angle. Since each pulse signifies a given rotational angle of the rotor, the frequency $f$ of the pulses appearing at the output of the difference gate 12 corresponds to an angle of $\alpha-\beta$, $\alpha$ being variable and $\beta$ being constant. As will be seen from FIG. 1, the frequency $f$ is also indicative of the ratio between the desired active power $I_w$ and the reactive power $I_b$, the value of $I_b$ also containing the magnetizing current of the three-phase machine 1.

The output pulses of gate 12 having the frequency $f$ are supplied to the input of a digital three-phase current generator substantially composed of a counter 13, a stepping switch 14, a distributing gate 15 and a digital-analog converter system 16. Further details of such a digital three-phase current generator will be described hereinafter with reference to FIG. 10. For the purpose of continuing the description of the system shown in FIG. 2, however, it will be suffice to note that the three outputs T, S and R of the digtal-analog converter 16 furnish three sinusoidal currents 120° phase displaced relative to each other whose cycle duration is inversely proportional to the feeding frequency $f$ and whose amplitudes are proportional to a direct voltage $I_e$ supplied to the digital-analog converter 16. In principle, therefore, the generator system permits realizing the three-phase current system according to the Equations 1 by supplying the three output currents of the digital-analog converter 16 through the datum-value inputs 6, 7 and 8 respectively of the thyristor control modules 2, 3.

In the system of FIG. 3, in distinction from that of FIG. 2, the magnetomotive force vector of the rotor is fixed not as to magnitude ($I_e$) and phase ($\beta$) but by presetting its reactive and active components ($I_w$) and $I_b$). This affords directly adjusting the active and reactive power of the synchronous machine. Another distinction from the system of FIG. 2 resides in ascertaining the angular position of the interesting rotor field vector A relative to the line-voltage vector not directly, but sensing only the rotor slip and having the correct phase position of the rotor rotating field relative to the stator rotating field automatically secured by means of a correcting device.

In FIG. 3, as well as in the subsequent illustrations, the same reference characters are employed as in FIGS. 2 and 1 for functionally corresponding items. The thyristors in the external rotor circuit as well as the appertaining control units 3 and the apertaining regulators 2 are collectively shown schematically at 17.

A pulse generator disc 20 is coupled with the rotor of the three-phase machine 1 and carries permanent magnets uniformly distributed along its periphery. The magnets produce a pulse sequence at the frequency $f_L$ as they pass along an inductive sensor 21. The pulses are shaped in a pulse shaping stage 22. Their frequency $f_L$ is proportional to the rotor speed. For increasing the accuracy of performance, the pulse sequence is passed through a frequency multiplier 23 before being applied to one of the inputs of a difference gate 12 where the pulses are compared as to coincide with a pulse sequence proportional to the line frequency and derived from the line current by means of a transformer 24' and through another pulse multiplier 24. The difference of the two pulse sequences results in a pulse sequence whose frequency is proportional to the rotor slip.

In addition to the speed-responsive pulses and the line-frequency pulses the difference gate 12 has a third input supplied with correction pulses $f_K$ issuing from a voltage-frequency converter 29. The pulses $f_K$ determine the phase position $\beta$ of the magnetomotive force vector $I_e$. The derivation of the correction pulses $f_K$ will be described in a latter place.

The output frequency $f$ of the difference gate 12 is supplied to the counter 13 which, acting through the stepping switch 14 and two distribution gates **15*a* and 15*b*, controls two digital-analog converters 16*a* and 16*b* so that the output terminals $T_a$, $S_a$, $R_a$ and $T_b$, $S_b$, $R_b$ of the two converters furnish respective three-phase currents of the same frequency but 90° phase displaced from each other. The amplitudes of these currents depend upon direct voltages applied to the input terminals 18 and 19 of the respective converters 16*a* and 16*b*. The sum currents of the digital-analog converters 16*a* and 16*b*, supplied to the terminals 6, 7 and 8 respectively of the excitation system 17** are in accordance with the equations:

$$\begin{aligned} I_R &= I_b^* \cos \alpha + I_w^* \sin \alpha \\ I_S &= I_b^* \cos (\alpha+120°) + I_w^* \sin (\alpha+120°) \\ I_T &= I_b^* \cos (\alpha+240°) + I_w^* \sin (\alpha+240°) \end{aligned} \quad (2)$$

The Equations 2, like the Equations 1, describe a vector which rotates relative to the rotor in the opposed direction by exactly the same angle as the one by which the rotor due to its slip lags behind the rotating field of the stator. This magnetomotive force vector of the rotating field can be looked upon as being composed of two mutually perpendicular components $I_b^*$ and $I_w^*$.

For fixing the phase position $\beta$ of the rotor field rotating synchronously with the stator field, the active current $I_w$ and the reactive current $I_b$ are sensed with the aid of a current transformer 25' and a measuring transformer 25. The pilot values thus obtained are compared with the desired (datum) values $I_w^*$ and $I_b^*$ in two comparator circuits 26 and 27. The resulting differences $\Delta I_b$ and $\Delta I_w$ are compared as to amount and sign (polarity) in a difference amplifier 28. Depending upon whether the difference $\Delta I_w - \Delta I_b$ is positive or negative, the above-mentioned voltage-frequency converter 29 issues the correction pulses of the frequency $f_K$ which vary the phase position of the rotor field vector until the desired datum values $I_w^*$ and $I_b^*$ coincide with the pilot values $I_w$ and $I_b$ so that the above-mentioned difference is equal to zero. With this condition established, the Equations 2 corresponds to the Equations 1, considering that $$\sqrt{I_w^{*2}+I_b^{*2}} = I_e \text{ and } \beta = \text{arc tan } \frac{I_w^*}{I_b^*}$$

Figure 4:
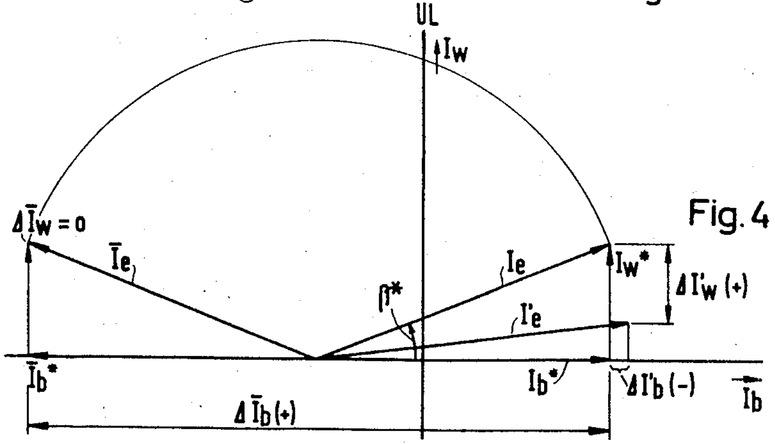

The functioning of the correction device shall be further explained with reference to the examples diagrammatically represented in FIG. 4. Assume that datum values $I_w^*$ and $I_b^*$ are entered into the digital-analog converters 16a and 16b at the respective terminals 18 and 19. As will be seen from the Equations 2, the resulting magnetomotive force vector $I_e$ is always formed of two mutually perpendicular components. This vector, although constant in magnitude and synchronous with the stator field, is not fixed as to phase position by the position of the line-voltage vector UL. For example, the magnetomotive force vector may occupy the position shown at $I'_e$ in which case the positive difference $\Delta I'_w$ will occur between the datum and pilot values of the active current, and the negative difference $\Delta I_b'$ will occur between the datum and pilot values of the reactive current. The term $\Delta I'_w - \Delta I'_b$ thus would have a positive sign, and the voltage-frequency converter 29 would furnish to the difference gate 12 a sequence of correction pulses until the total input of gate 12 becomes zero, and the desired load angle $\beta^*$ and consequently the desired active and reactive current values $I_w^*$ and $I_b^*$ are attained. In the operational state represented by the vectorial position $\bar{I}_e$, the active-current value would coincide with the desired datum value, but the reactive current would have a wrong value so that a positive difference $\Delta\bar{I}_b$ will result. Consequently, the input of the voltage-frequency converter 29 will receive a negative voltage so that the magnetomotive force vector of the rotating field is now rotated by corresponding correction pulses back to the position at which the difference $\Delta I_w - \Delta I_b$ again becomes zero.

In principle, the above-described correction may occur only once upon each starting-up of the machine. However, the correction device may also become effective to perform a regulating function whenever the adjusted datum values $I_w^*$ and $I_b^*$ do not coincide with the respective pilot values $I_w$ and $I_b$. In this manner, any spurious pulses in the frequency channel are also compensated.

A system as shown in FIG. 3 can be used as a universally regulated drive. When the active current value $I_w^*$ is preset as a constant magnitude, the machine produces a torque that is independent of speed. If, however, this datum value is modified during driving operation, for example guided by a speed regulator, a largely adjustable speed can be obtained. In all of such cases there remains the advantage of permitting the reactive load to be adjusted independently of the active current and speed. For generator operation of the machine there analogously results the advantage that the given adjustable active and reactive power can be delivered into the line independently of the driving speed applied to the generator. Consequently, the stability problems usually encountered with the conventional synchronous machines are obviated.

The above-explained torque-speed characteristics of a three-phase machine operating as a motor in a system according to the invention are exemplified by the diagram shown in FIG. 5 in which the abscissa indicates motor speed as the ratio $n/n_s$ of the actual rotor speed to the synchronous speed fixed by the line frequency, and the ordinate indicates torque M in arbitrary units. The torque characteristics for any given setting of the machine extend horizontally as is indicated by horizontal straight lines in the diagram. Typical is the fact that the motor torque is independent of the motor speed within a large speed range, the magnitude of the torque being dependent upon the selective parameter $I_w^*$. For comparison, the diagram of FIG. 4 also shows at SM the speed-torque characteristic of a conventionally operated synchronous machine and at ASM the typical speed-torque characteristic of an asynchronous (induction) machine.

FIG. 6 relates to the application of the invention to an active-power buffering machine. As mentioned, such machines can be used to advantage for the operation of proton accelerators or other equipment involving the occurrence of active-power shocks which, by virtue of the invention, can be kept away from the feeding power line.

According to FIG. 6, a proton accelerator (not shown) is energized by pulses through thyristors 40 from a synchronous generator 31 whose rotor is mechanically coupled to the rotor of a three-phase machine 1, the latter being regulated in a system according to the invention. If necessary, the rotating mass of the intercoupled rotating parts can be increased by an additional fly wheel 32 for sufficient storage of energy.

The dynamoelectric machine 1 is provided with an excitation system 17 and a digital current generator 33 as shown in FIG. 3 and described above. The datum value $I_w^*$ which determines the active power is furnished from the output of an active-current regulator 34. The reactive current $I_b^*$ can be preset independently by a control or regulating device 35 of any suitable type not further described herein. The datum value $p^*$ of the active-current regulator 34 is set to the median value of the active power required for each load cycle. A control device 36 of known type adapts this median value in the corrective sense automatically to the load requirement, for example by utilization of sequential speed maxima. For supervisory control of the machine 1, operating as a drive motor, there is provided an additional speed regulating circuit, and the output of the speed regulator 37 is connected through a threshold member 38 so that within a given insensitivity range, for example of ±3%, of a predetermined rated speed, the speed regulator will not enter into operation. When these response limits of the threshold member 38 are exceeded, the speed regulator 37 commences to modify the value $I_w^*$ so as to continue the regulation and thereby prevent a departure from the permissable speed limit. Due to the follow-up guidance of the power datum value $p^*$ toward the median value of the active power to be delivered, the speed, as a rule, varies during normal operation within the insensitivity range determined by the threshold member 38. The driving machine 1, therefore, derives from the power line UL always a constant active power irrespective of fluctuations in torque or speed caused at the machine shaft by the shock load imposed upon the synchronous generator 31.

The systems described above with reference to FIGS. 2, 3 and 6 comprise a digital three-phase current generator equipped with a digital-analog converter (16 in FIG. 2; 16a, 16b in FIG. 3) for producing a three-phase sine voltage. FIG. 7 illustrates schematically the fundamental circuit elements of a hyperbolic digital-analog converter suitable for such generation of sine functions. This function generator comprises preferably electronic switches $S_1$, $S_2$ . . . $S_n$ which close upon a constant direct voltage U in series with a resistor having the conductivity value $G_r$. The electronic switches are in series with respective resistances G, 2G, 4G . . . whose respective conductivity values are staggered, for example in accordance with the binary code. The switches are controlled by the counting-step outputs of an $n$-step binary counter (13 in FIG. 2, for example). When counting from zero upwardly, the increasing number Z of input pulses results in producing a hyperbolic course of the output magnitude I as represented in principle in FIG. 7*b* by the curve *a*. When the counter, commencing with the maximum value, is counted in the reverse direction until it is empty, or when the switches $S_1$ to $S_n$ are actuated by complementary counter outputs, the time curve is in accordance with the complementary curve $\bar{a}$ in FIG. 7*b*. By reversing the polarity of the voltage U, corresponding negative function curves $-a$ and $-\bar{a}$ can be produced.

The digital three-phase current generator employed in the system according to the invention takes advantage of the fact that a sine function, taken over its complete cycle, can be composed of the function values occurring in the region from 0° to 60°. This will be seen from FIG. 8 according to which the complete cycle is subdivided in twelve equal sections. After the second, fourth, eighth, tenth and twelfth section, that is, after each 60°, the wave configuration repeats itself with changing polarity signs. For example, if one views the first and second sections, the phases R and T pass through the same value range *a* and *b* entered in the direction of the ordinate, in mutually opposed directions. The function value for the phase S in sections 1 and 2 is obtained by utilization of the three-phase symmetry condition according to which at any moment the sum of the function values must be equal to zero.

In principle, therefore, the function values of the complete three-phase system can be generated with the aid of equally dimensioned hyperbolic digital-analog converters of which each covers a value range of 0° to 60°, or with the aid of two differently dimensioned digital-analog converters of which one covers the value range of 0° to 30° and the other the range of 30° to 60°. In the latter case the sine function can be approached to a still better extent. Regardless of the ranges thus chosen, the digital-analog converters are designed in principle as represented schematically in FIG. 7*a*. When using two differently dimensioned digital-analog converters for generating the sine function in the value ranges *a* and *b*, the above-mentioned symmetry condition has the result that the function value $-c$ of phase S in section 1 has the value $-(a+\bar{b})$. Analogously, in section 2 the function value $-c$ of phase S has the value $-(\bar{a}+b)$. The table presented in FIG. 9 indicates analogously the flow sense and polarity of the individual value ranges for the different phases.

FIG. 10 shows a complete digital three-phase current generator in detail for use in systems according to the invention, for example the one shown in FIG. 3. A digital generator comprises an *n*-position binary counter 13 whose input terminal 30 receives the pulse frequency *f*. Connected to the counter is a digital-analog converter system which for each phase is denoted by daw. Each system daw comprises four units corresponding to FIG. 7 of which two units are assigned to the positive and negative value ranges *a* and *b*. The outputs of the digital-analog converters daw are connected through resistors to the input of adding amplifiers 38. Three converter systems daw receive an amplitude-determining operating voltage *z* at a common input terminal 18. This operating voltage is constant and proportional to the datum value $I_w$*. The common input terminal of the three other converters daw receives a voltage proportional to the reactive power $I_b$* to be adjusted. The voltages $I_w$* and $I_b$* correspond to the voltage generally denoted by U in FIG. 7.

The value range *a* comprises the values of the sine function from 0° to 30°, and the value range *b* contains the sine-function values from 30° to 60°. The digital-analog converter units for the value ranges $+a$ and $-a$ are connected to a group Z of the *n* counter outputs of the reversible counter 13. The digital-analog converter units for the value ranges $+b$ and $-b$ are connected to the other group of counter outputs denoted by $\bar{Z}$, the outputs $\bar{Z}$ being complementary to the outputs Z. A gate circuit 39 evaluates the outputs of the counter stages in such a manner that each time the end count of the counter 13 is reached, which takes place at the end of each of the twelve sections indicated in FIG. 8, the stepping switch 14 is switched forward one step and the counting direction of the counter is reversed.

This alternating forward and reverse switching of the counter causes the digital-analog converters for $\pm a$ and $\pm b$ to also run alternately forward and reverse, $\pm a$ always in mutually contrary sense to $\pm b$, since these respective converters are controlled from complementary outputs of the counter. The value range $\pm c$ for the maximum amplitudes of the sine functions of $\pm 60°$ to $\pm 90°$ and con $\pm 90°$ to $\pm 120°$ are gained, as explained above, as the sum of the values *a* and *b* with reversed signs. On account of the symmetry condition there is $c=(a+\bar{b})$ and $\bar{c}=(\bar{a}+b)$. The absolute amounts of the function values *a*, *b* and *c* increase when progressing in the positive direction along the abscissa, whereas the reverse applies to the values $\bar{a}$, $\bar{b}$ and $\bar{c}$.

The correct order and release of the ranges $\pm a$ or $\pm b$, subjected to the same control performance at each moment in the different digital-analog converters in accordance with the scheme apparent from FIG. 9, is secured by the stepwise forward switching of the distribution gates 15*a* and 15*b* under control by the stepping switch 14. The distribution gate 15*a* is correlated to the digital-analog converter 16*a*, and the distribution gate 16*b* to the converter 15*b*. The three-phase current system $R_b$, $S_b$, $T_b$ leads by 90° the three-phase system $R_a$, $S_a$, $T_a$, as will be recognized by a comparison of the value sequences according to the scheme shown in FIG. 9.

After fully passing through its counting range, the counter 13 again commences a run and then switches the stepping switch 14 one step forward. Of the twelve steps of the stepping switch, only one conducts an output signal at a time and thus defines the section operative at the time in order to thereby determine with the aid of the distribution gates the proper correlation of the value range applicable to this section of the sine function being generated.

The frequency of the generated three-phase system is proportional to the frequency *f* supplied to the input terminal 30 and inversely proportional to the counting capacity of the counter 13 and the number of steps in the stepping switch. Consequently, by selection of these data the frequency can be readily adapted to any requirements as may occur in practice.

In the event of failure of the frequency supplied to the input terminal 30, which occurs for example when the three-phase machine runs in synchronism, the values then attained by the two digital-analog converters 16*a* and 16*b* remain preserved and there results a sinusoidal distribution of the rotor field along the rotor periphery, this field distribution being at a standstill relative to the rotor of the synchronous machine.

To those skilled in the art it will be obvious from a study of this disclosure that our invention permits of a great variety of modifications with respect to circuitry and individual components or modules and consequently may be given embodiments other than those illustrated and described herein, without departing from the essential features of our invention and within the scope of the claims annexed hereto.

We claim:

1. A system for regulation of a three-phase dynamo-electric machine having a stator for producing a rotating stator field and having a rotor with three phase rotor with three phase rotor windings, and with external stator field synchronous guidance of the rotating field of the rotor, whereby the rotor windings are energized by a slip frequency current from an external source, said system comprising:

slip rings connected to said rotor windings; controllable rectifiers connected to said rotor windings; phase current control circuits for controlling said rectifiers, said control circuits having inputs and outputs connected to said rectifiers; and phase current regulating means connected to the inputs of said control circuits for supplying to said control circuits the difference between the pilot value of the phase current the datum value of the phase current, said current regulating means comprising a three-phase generator having contact-free components for providing said datum valves, said generator producing voltages at slip frequency and adjustable in phase position.

2. In a system according to claim 1, said regulating means comprising a three-phase current generator having an input connected to said machine so as to vary in response to the slip, said generator having an output which forms the datum values for said regulating means.

3. In a system according to claim 2, said rectifiers being thyratrons and said three-phase current generator being formed substantially of a network of solid state components.

4. In a system according to claim 3, said three-phase current generator means comprising a digital logic network having a repeating counter with mutually complementary outputs, a stepping switch controlled by said counter in the end positions thereof, a distribution gate connected to the stepping switch to be controlled thereby, non-linear hyperbolic digital-analog converter means for generating a sine function within a range of 60°, said digital-analog converter means having inputs connected to said respective mutually complementary outputs of said counter and being also connected to said distribution gate to generate said sine function through the entire cycle range for all of the three phases.

5. In a system according to claim 4, said converter means comprising two digital-analog converters 90° phase displaced from each other, means for supplying to said converters two constant, adjustable voltages proportional to the desired active power and reactive power respectively, said counter being connected to both of said digital-analog converters, a difference gate having its output connected to the input of said counter, and means for supplying to said difference gate a pulse sequence proportional to the line frequency and a pulse sequence proportional to the slip frequency of the machine.

6. A system according to claim 5, comprising correction-pulse means for producing correction pulses from the difference between the departure of the datum values and the pilot values of the active power, on the one hand, and the departure between the datum value and the pilot value of the reactive power, on the other hand, said correction-pulse means having an output connected to an input of said difference gate, and a voltage-frequency converter interposed between said correction means and said difference gate.

7. A system according to claim 6 in which the three-phase machine is operated for buffering the power demand, said system comprising an active-current regulator connected with the means for controlling the datum value ($I_w$*) for reactive power so as to modify this datum value within a given speed range independently of the machine speed.

8. A system according to claim 7, comprising a shock-current generator mechanically coupled with said rotor of said synchronous machine, and a power supply line connected to said synchronous machine for operation of the latter as a motor to drive said generator, whereby said system operates to buffer active current shocks relative to said line.

References Cited

UNITED STATES PATENTS

| | | | |
|---|---|---|---|
| 2,359,145 | 9/1944 | Myers et al. | 318—237 XR |
| 3,144,595 | 8/1964 | Graybeal | 318—176 XR |
| 3,327,189 | 6/1967 | Hedstrom | 318—237 XR |
| 3,375,433 | 3/1968 | Haggerty et al. | 318—237 XR |
| 3,383,575 | 5/1968 | Bobo | 318—179 |

ORIS L. RADER, Primary Examiner

G. RUBINSON, Assistant Examiner